Jan. 20, 1942.        G. E. PALMER        2,270,228
ELECTRIC METER CONNECTION APPLIANCE
Filed Jan. 25, 1938        3 Sheets-Sheet 1
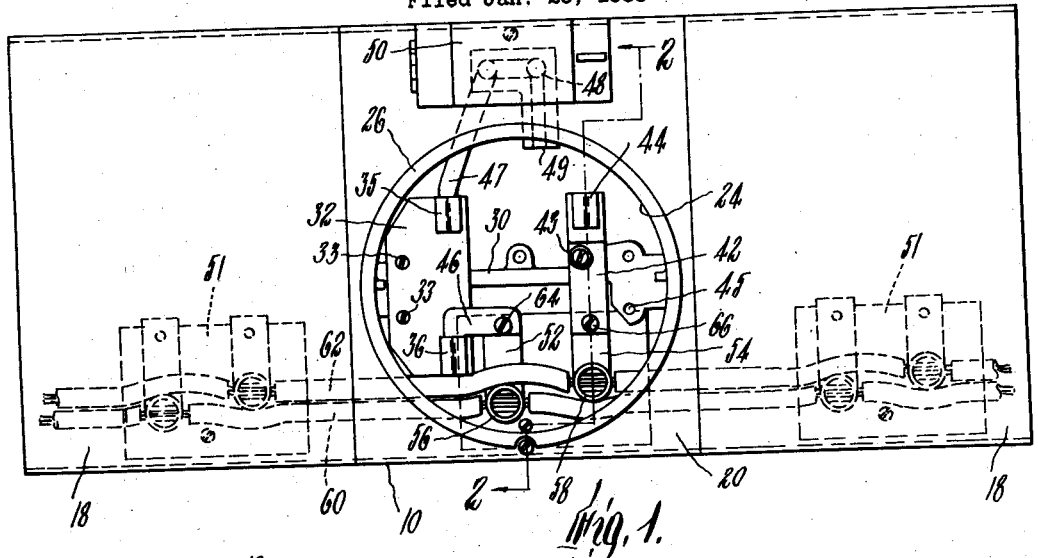
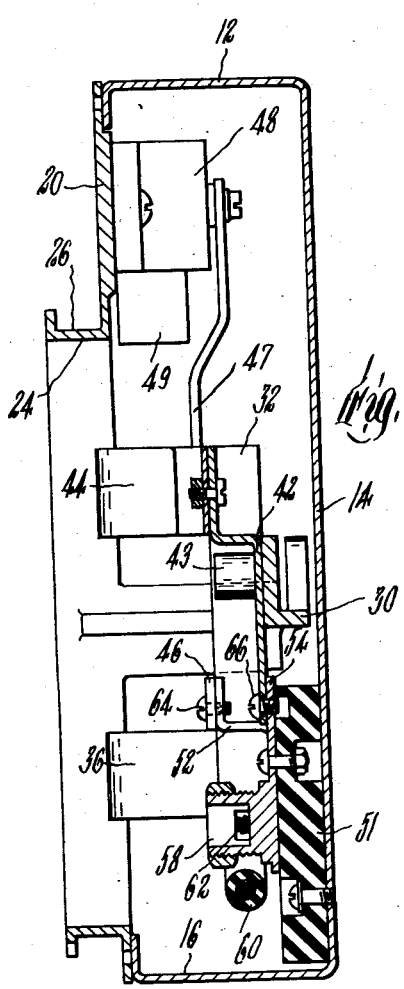
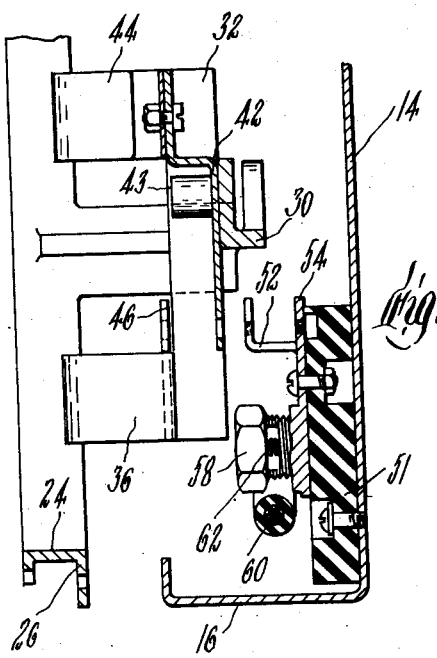

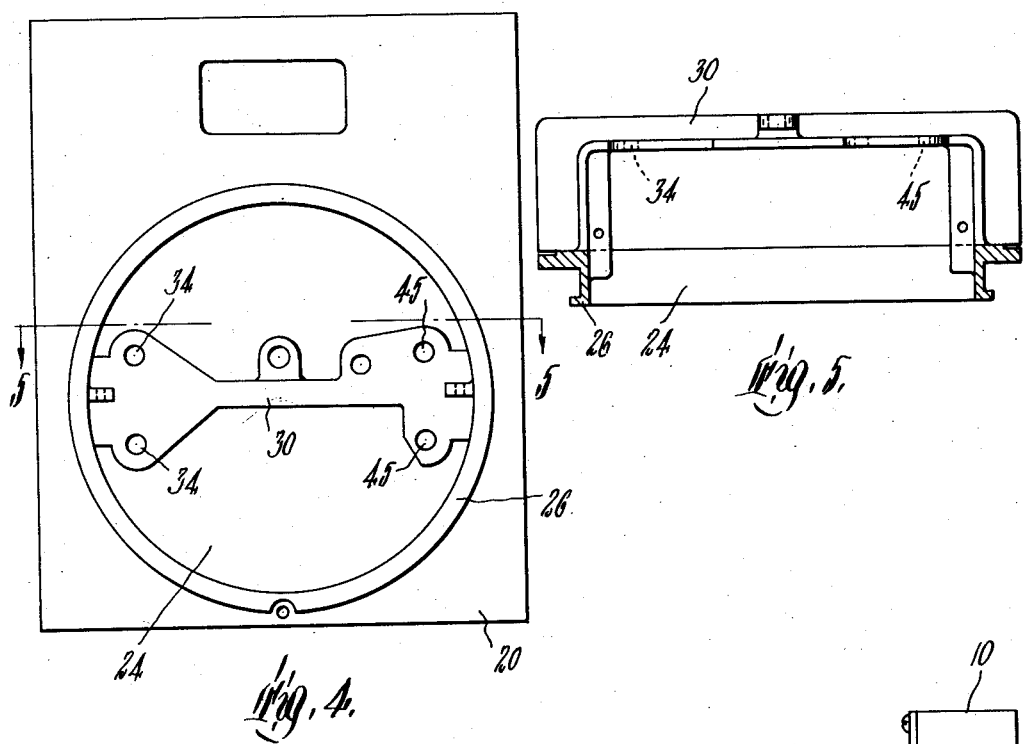
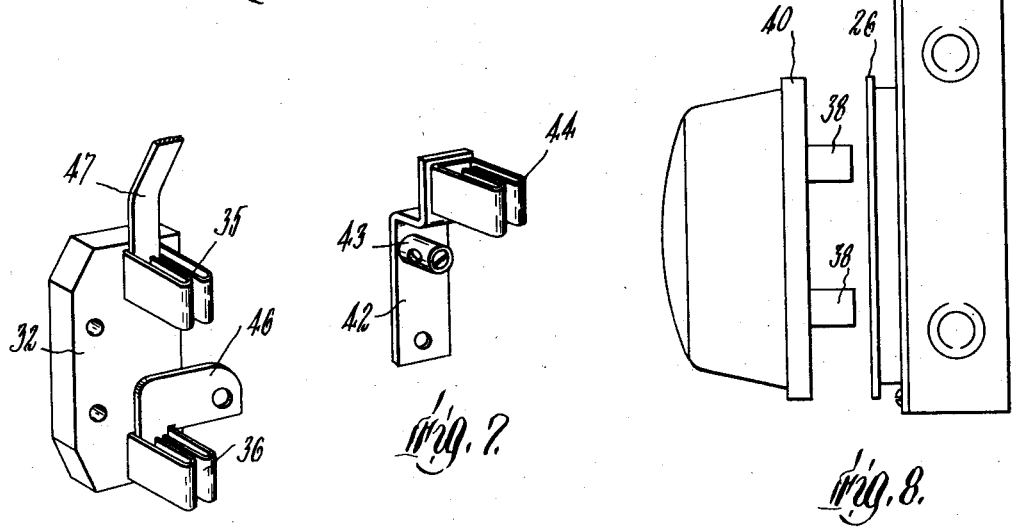

Jan. 20, 1942.  G. E. PALMER  2,270,228
ELECTRIC METER CONNECTION APPLIANCE
Filed Jan. 25, 1938  3 Sheets-Sheet 3
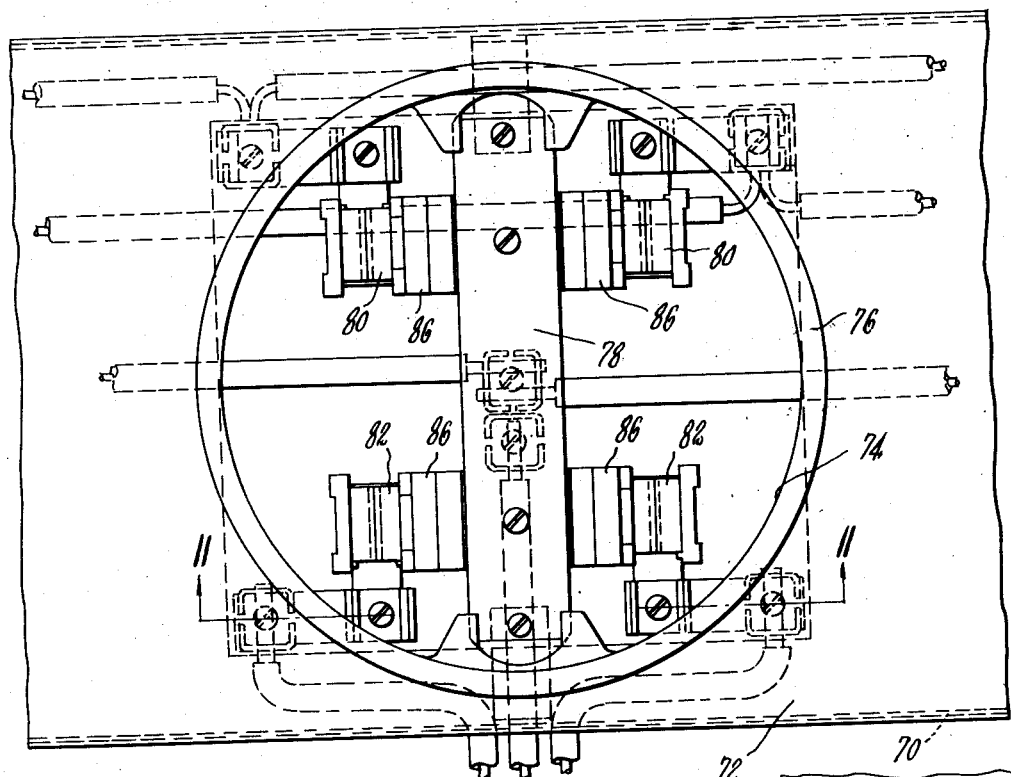
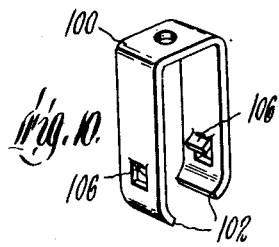
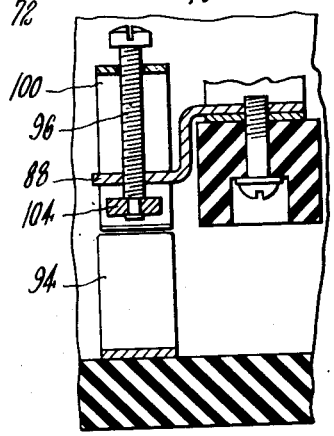
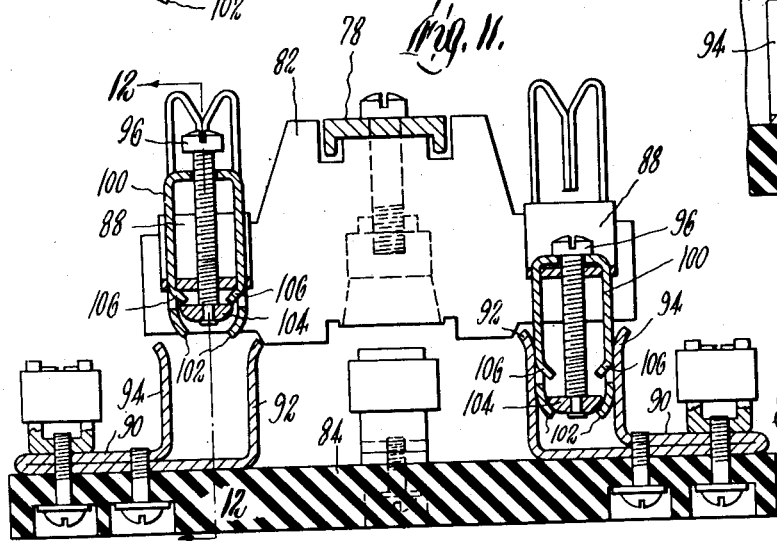

Patented Jan. 20, 1942

2,270,228

UNITED STATES PATENT OFFICE 2,270,228

ELECTRIC METER CONNECTION APPLIANCE

Granville E. Palmer, Cambridge, Mass., assignor, by mesne assignments, to Westinghouse Electric & Manufacturing Company, East Pittsburgh, Pa., a corporation of Pennsylvania Application January 25, 1938, Serial No. 186,791

13 Claims. (Cl. 175—224)

This invention relates particularly to an electric meter connection appliance which includes a connection device adapted to be mounted in a trough or box with which it is associated and adapted to detachably support a meter especially designed to be secured thereto.

In an appliance of this character as heretofore made and used, the terminals for the attachment of the longitudinal bussing wires are carried directly by a connection device, which in turn is carried by the removable front cover. As a result of this arrangement, it is necessary to connect the bussing or circuit wires to their respective terminals after the connection device and the cover are in place, and such connection of the housing wires is very difficult and troublesome by reason of the lack of sufficient working space.

In accordance with the present invention, the terminals for connection with the bussing wires are mounted on an insulating block in fixed position in the box and the meter connection device at the front is detachably connected with the terminals on the block. This permits the bussing wires to be connected to their respective terminals before the front cover and the connection device are put in place, thus allowing ample working space for making the desired connections.

The invention also includes improved connecting or bridging means between conductors on the insulating block and on the meter connection device, said bridging means being actuable to move positively into and out of electrical connection with the conductor on the insulating block and to effect a tight electrical connection with the conductor on the block as well as with the conductor on the meter connection device.

For a more complete understanding of the invention, reference may be had to the embodiments thereof hereinafter described and illustrated on the drawings of which Figure 1 is a front view of a trough or box embodying the invention, the detachable meter being omitted.

Figure 2 is a section on the line 2—2 of Figure 1.

Figure 3 is a fragmentary section similar to Figure 2 but showing certain parts in different positions.

Figure 4 is a front elevation of the central cover section shown in Figure 1.

Figure 5 is a sectional view on the line 5—5 of Figure 4.

Figure 6 is a perspective view of an insulation block shown in Figure 1.

Figure 7 is a perspective view of a conductor shown in Figure 1.

Figure 8 is an end view of the trough or box, together with a meter adapted to be mounted thereon.

Figure 9 is a fragmentary front view of a box or trough containing a modified form of the invention.

Figure 10 is a perspective view of a U-shaped member shown in Figure 9.

Figure 11 is a section on the line 11—11 of Figure 9.

Figure 12 is a section on the line 12—12 of Figure 11.

Referring to the drawings, 10 represents a housing comprising a box or trough adapted for containing service or bussing wires and also load wires. The housing 10 may be a trough adapted for cooperation with two or more meters or it may be a shorter unit with side walls at the ends and adapted for cooperating with only a single meter. As shown, it may be assumed that the trough is adapted for at least three meters, but the parts associated with only a single meter are shown, with the exception of the extra service wire terminals.

The trough 10 is provided with a top wall 12, a rear wall 14 and a bottom wall 16. At the front is a removable cover which, as indicated in Figure 1, may consist of a number of panels or sections adapted to be secured in place by any convenient means preferably inaccessible when the trough is completely assembled with one or more meters.

Two kinds of panels are shown, namely, blank panels 18 and an apertured panel 20 for supporting a meter. These two kinds can be selectively and interchangeably employed according to the desired number and location of meters to be mounted on the trough. As shown in Figures 1 and 2, the panel 20 has a circular aperture 24 surrounded by a circular rim or ring 26 to which a meter is adapted to be secured. This ring is shown as integral with the panel 20, but, if desired, it may be permanently secured thereto. Carried by the ring 26 is a transverse member 30 on which is mounted a block of insulating material 32 by means of screws 33 which are threaded into holes 34 in the member 30. This block carries a pair of clips 35 and 36 adapted to be engaged by conductor blades 38 projecting rearward from the meter 40 (Figure 8). Also mounted on the transverse member 30 is a rigid conductor or bracket 42 which carries a terminal 43 for a load wire connection and a third clip 44 engageable by a meter blade when the meter is in position on the ring 26. The arrangement of parts illustrated in Figure 1 is for a two-wire system, the current to the load circuit passing from the clip 36 to the clip 35 through the meter, the third clip 44 providing the connection for potential across the service wires. In order to make the device adaptable for use in a three-wire circuit, the transverse member 30 is provided with a pair of threaded holes 45 for the attachment of a second insulating block similar to the block 32, the meter in such case having four blades instead of three. The clip 36 is mounted with a rigid conductor 46 or contact element on the block 32. The clip 35 is mounted with a conductor 47 on the block 32. The conductor 47 extends through a disconnect device 48 to a terminal 49 for a load wire. The device 48 may be exposed by swinging back a hinged lockable cover 50 so that the load circuit can be opened without removal of the meter.

Mounted in a fixed position in the box and preferably on the rear wall thereof is an insulating block 51. Conductors or brackets 52 and 54 are secured to the block 51 and are electrically connected respectively with terminals 56 and 58 adapted for connection with respective bussing or circuit wires 60 and 62. The conductors 42 and 46 are formed and positioned so as to engage respectively the conductors 52 and 54 when the meter-supporting panel 20 and the elements carried thereby are in position. Any suitable means, such as screws 64 and 66 which extend loosely through the conductors 42 and 46 and are threaded into conductors 52 and 54, may be employed to press these conductors firmly together when in use. As shown in Figure 1, these screws are readily accessible when the panel 20 is in place but the meter is not in place.

It is apparent from the foregoing description that the bussing or circuit wires can be installed in the trough and readily connected to their respective terminals when the front cover is off, permitting free access to the interior of the trough. After the circuit wires have been installed and connected as shown, the front cover can be put in place, as shown in Figure 1, the conductors 46 and 42 coming into engagement respectively with the conductors 52 and 54 on the rear block 51. The screws 64 and 66 may then be inserted through the holes in the conductors 46 and 42 and screwed into the threaded holes in the conductors 52 and 54, these screws being readily accessible through the aperture 24. The meter 40 can then be put in position so that its blades engage the clips 35, 36 and 44. The meter is then locked in position by any suitable means, such means being well known in the art, closing the box or trough completely so that the apparatus therein is entirely concealed and inaccessible.

In the embodiment of the invention illustrated in Figures 9 to 12 inclusive, a meter trough or housing 70 is provided with a front cover 72 which is secured thereto by any suitable means and which has a circular opening 74 surrounded by a metal ring 76. This ring is adapted to be engaged by a meter and is attached to or integral with the cover 72. Secured to the ring is a transverse supporting member 78 to which is secured a pair of insulating blocks 80 and 82, these blocks being located near the front of the trough. A rear insulating block 84 is mounted in fixed position within the trough, preferably on the rear wall thereof. Mounted on each of the blocks 80 and 82 are a pair of clips 86 and associated conductors 88 connected therewith, the clips 86 being engageable by connecting blades of a meter. Mounted on the rear insulating block 84 are a number of conductors 90 each of which includes or is connected to a pair of forwardly projecting parallel jaws 92 and 94, the forward end portions of which are preferably bent away from each other as indicated in Figure 11. A bridging or connecting device is provided to connect and disconnect each conductor 88 with its corresponding pairs of jaws 92 and 94. Each bridging or connecting device may comprise a screw 96 threaded through an aperture in the conductor 88. The screw also passes loosely through a hole in a U-shaped member 100 having a pair of parallel legs the end portions of which are inclined toward each other as at 102. At the rear end of the screw 96 is loosely mounted a wedging element 104 which may consist of a rectangular element of metal or other suitably hard material having rounded or chamfered side edges adapted to engage the inclined end portions 102 of the U-shaped member 100. Spaced from the end portions 102 are one or more lugs 106 engageable by the wedging member 104 when it is moved away from the inclined end portions 102. The legs of the U-shaped member 100 are parallel and are spaced apart so as to fit between the jaws 92 and 94 when the U-shaped member 100 is moved rearwardly by rotation of the screw 96. Figure 11 illustrates two of the members 100 in different positions, the position shown at the left being that in which the conductors are disconnected and the position at the right being that at which the conductors are connected by the member 100. When the screw 96 is rotated in one direction, the element 104 moves into engagement with the end portions 102 and then pushes the member 100 toward the rear into engagement between the jaws 92 and 94. When the member 100 has reached its rear position, continued advance of the screw 96 and element 104 toward the rear wedges the legs of the member 100 away from each other so that they press strongly against the jaws 92 and 94, thus making a good electrical connection between these members.

Reverse rotation of the screw 96 backs the wedging element 104 away from the inclined portions 102, thus relieving the pressure of the legs of the member 100 against the jaws 92 and 94. Further movement of the screw 96 brings the wedging element 104 in contact with the lugs 106, whereupon the member 100 is moved positively forward with the screw 96 until it is entirely clear of the jaws 92 and 94. Thus the electrical connection between the conductor 88 and its corresponding jaws 92 and 94 is positively broken but can be re-made by rotating the screw 96 in such direction as to move it again toward the rear.

It is evident that various changes and modifications may be made in the embodiments of the invention herein shown and described without departing from the spirit or scope of the invention as defined in the following claims.

I claim:

1. In a device of the class described, the combination of a trough or box adapted for containing bussing or circuit wires, means normally closing completely the front of said box, said means including a front wall having a large opening therethrough and a meter having rearward extending blades, an insulating block in fixed position in the box, conductors mounted thereon, terminals electrically connected with the conductors on said block and connectible with respective bussing or circuit wires, and detachably mounted meter connection means including a plurality of clips normally engaged with said meter blades and rigid conductors positioned to engage the conductors on said block when said connection means is in place, the said conductors being visible and accessible through said opening when the meter is not in place and the said conductors being entirely concealed and inaccessible when the meter is in place.

2. In apparatus of the class described, a box or trough adapted for receiving bussing or circuit wires, a front wall having a large aperture therethrough, a rear block of insulating material secured at the rear of said box, a terminal mounted on said block and connectible with a bussing or circuit wire, a pair of substantially parallel spaced jaws projecting forward from said block and connected to said terminal, meter connecting means including a front block of insulating material secured to said front wall, a clip on said front block engaged by a meter blade when the meter is in position covering said aperture, a conductor mounted on said front block and connected to said clip, and a bridging device movable to connect and disconnect said jaws and said conductor, said bridging device comprising a U-shaped element with substantially parallel legs spaced to fit between said jaws and with end portions inclined toward each other, a screw threaded through said conductor, a wedging element movable by rotation of said screw to press against said inclined portions of said legs to move said U-shaped element rearward into a position between said jaws and then to press said legs laterally against said jaws, and lugs on said legs engageable by said wedging element when the screw is rotated in the opposite direction to retract said U-shaped element from said jaws.

3. In a device of the class described, the combination of a trough or box adapted for containing bussing or circuit wires and having a large opening in the front wall thereof, an insulating block in fixed position in the box and having conductors thereon, terminals electrically connected with the conductors on the block and connectible with the respective bussing or circuit wires, a meter connection device detachably mounted at the opening in the front wall of the box and having a large opening therethrough from front to rear, a meter having rearward projecting terminals or blades normally detachably engaged with clips forming a part of the connection device, the said meter normally serving in conjunction with the connection device to entirely close the opening in the front wall of the box, and two rigid conductors on the detachable connection device formed and positioned to engage the respective conductors on the block when the connection device is in place, the said conductors being visible and accessible through the opening in the connection device when the meter is not in place and the said conductors being entirely concealed and inaccessible when the meter is in place.

4. In a device of the class described, the combination of a trough or box adapted for containing bussing or circuit wires and having a large opening in the front wall thereof, an insulating block in fixed position in the box and having conductors thereon, terminals electrically connected with the conductors on the block and connectible with the respective bussing or circuit wires, a meter connection device mounted on the front wall of the box at the opening therein and detachable independently of the front wall, the said connection device having a large opening therethrough from front to rear, a meter having rearward projecting terminals or blades normally detachably engaged with clips forming part of the detachable connection device, the said meter normally serving in conjunction with the connection device to entirely close the opening in the front wall of the box, and two rigid conductors on the detachable connection device formed and positioned to engage the respective conductors on the block when the connection device is in place, the said conductors being visible and accessible through the opening in the connection device when the meter is not in place and the said conductors being entirely concealed and inaccessible when the meter is in place.

5. In a device of the class described, the combination of a trough or box adapted for containing bussing or circuit wires and having a large opening in the front wall thereof, an insulating block in fixed position in the box and having conductors thereon, terminals electrically connected with the conductors on the block and connectible with the respective bussing or circuit wires, a meter connection device detachably mounted at the opening in the front wall of the box and having a large opening therethrough from front to rear, a meter having rearward projecting terminals or blades normally detachably engaged with clips forming part of the connection device, the said meter normally serving in conjunction with the connection device to entirely close the opening in the front wall of the box, two rigid conductors on the detachable connection device formed and positioned to engage the respective conductors on the block when the connection device is in place, and means for rigidly connecting the conductors on the connection device with the conductors on the block, the said means being visible and accessible through the opening in the connection device when the meter is not in place and the said conductors being entirely concealed and inaccessible when the meter is in place.

6. In a mounting for an electric meter of the type having a plurality of rearwardly-projecting, current-conducting prongs, the combination of a housing having an opening at the front, a removable cover for said opening, said cover having an opening, an insulating block in fixed position within said housing, terminals on said block for the attachment of conductors, prong-receiving jaws carried by said removable cover, and rigid conductors carried by said cover attached to said jaws, respectively, and normally engaging said terminals on said block.

7. In a mounting for an electric meter of the plug-in type provided with rearwardly projecting, current-conducting blades, the combination of a housing having top and bottom, and front and rear walls, at least a part of said front wall being removable to afford access to the interior of said housing, said front wall having an opening to be closed by the meter and to admit the meter blades to the interior of said housing, current-conducting jaws within said housing to receive at least certain of said blades, said jaws being carried by said removable part of said front wall, an insulating block mounted in fixed position within said housing independently of said removable part of said front wall so as to remain within said housing when said cover is removed, terminals supported by said insulating block, current conductors secured to said terminals, respectively, rigidly positioned conductors attached to said terminals, respectively, rigidly positioned conductors attached to said jaws, respectively, and carried by and removable with said part of said front wall, and means affording readily attachable connections between the first and second-named rigidly positioned conductors, respectively, said rigidly positioned conductors being positioned substantially adjacent each other when said part of said front wall is in attached position.

8. In a mounting for an electric meter of the type having a plurality of rearwardly-projecting, current-conducting prongs, the combination of an enclosure having a removable cover provided with a meter-receiving aperture; current-conducting prong-receiving jaws carried by and removable with said cover; an insulating base mounted within said enclosure independently of said removable cover so that said cover can be removed without removing said base; connectors on said base for the attachment of circuit wires; conductors electrically connected to said connectors, respectively, and supported by said base; and rigid conductors electrically connected to said jaws, respectively, and carried by and removable with said cover; the last-mentioned rigid conductors being superimposed upon the first-mentioned conductors and separable therefrom by movement in a direction lengthwise of said prongs.

9. In a mounting for a meter of the plug-in type having a plurality of rearwardly-projecting, current-conducting prongs, the combination of a housing having a removable cover provided with an aperture to be closed by the meter and to admit the meter prongs to the interior of said housing; insulating means supported in part, at least, in fixed position within said housing independently of said removable cover; terminals for the attachment of circuit wires, said terminals being mounted on that part of said insulating means which is supported in fixed position; current-conducting, prong-receiving jaws within said housing positioned to receive meter prongs as a plug-in meter is mounted over said aperture, at least certain of said jaws being supported by at least a part of said insulating means; detachable rigid fastening means attaching at least certain of said jaws to at least certain of said terminals; and means attaching the last named of said jaws to said cover for removal therewith.

10. In a mounting for a meter of the plug-in type having a plurality of rearwardly-projecting, current-conducting prongs, the combination of a housing having a removable cover provided with an aperture to be closed by the meter and to admit the meter prongs to the interior of said housing, a transverse member carried by said cover and extending across said aperture; insulating means at least a portion of which is mounted in fixed position within said housing independently of said cover; terminals in fixed position within said housing for the attachment of circuit wires, said terminals being supported by the aforesaid fixed portion of said insulating means; current-conducting, prong-receiving jaws within said housing positioned to receive meter prongs as a plug-in meter is mounted over said aperture, at least certain of said jaws being supported by at least a portion of said insulating means; fastening means attaching said transverse member in place in said housing; detachable rigid fastening means attaching at least certain of said jaws to at least certain of said terminals; and means attaching the last named of said jaws to said transverse member for movement therewith.

11. In a mounting for an electric meter of the plug-in type having a plurality of rearwardly-projecting, current-conducting prongs, the combination of a housing having a removable cover provided with an aperture to be closed by the meter and to admit the prongs to the interior of the housing, insulating means mounted in fixed position within said housing independently of said cover, terminals supported by said insulating means, current-conducting, prong-receiving jaws carried by said cover, fixed, shape-retaining conductors secured to said terminals, respectively, movable shape-retaining terminals carried by said cover and secured to at least certain of said jaws, said movable terminals being arranged to move into proximity with said fixed conductors when said cover is put in place, and means comprising screws to secure said movable terminals to said fixed conductors.

12. In combination, a detachable electrical instrument having first contact members, a housing having a base portion and a cover portion, said cover portion being movable relative to said base portion and having an aperture covered by said electrical instrument, second contact members carried by said cover portion for detachably engaging said first contact members when said electrical instrument is operatively associated with said cover portion, said second contact members being designed to disengage said first contact members in response to withdrawal of said electrical instrument from said cover portion, first conductor means, second conductor means for conductively engaging said first conductor means, said second conductor means being conductively connected to said second contact members, and means mounting said first conductor means and said second conductor means respectively on said base portion and said cover portion for relative movement substantially into and out of operative engagement in response to movement of said cover portion relative to said base portion.

13. A mounting for a detachable electric meter having contact blades projecting therefrom comprising a housing having a base portion and a cover portion, said cover portion being movable relative to said base portion and having an aperture designed to be covered by a detachable electric meter, contact jaws carried by said cover portion adjacent said aperture for detachably receiving the contact blades of a detachable electric meter when said electric meter is operatively associated with said cover portion, insulating means carried by said base portion within said housing, first conductors carried by said insulating means, said conductors being maintained in substantially predetermined positions relative to said base portion, and second conductors carried by said cover portion in conductive association with said contact jaws, said second conductors being maintained in substantially predetermined positions relative to said cover portion wherein said first conductors substantially abut said second conductors when said cover portion is in covering position relative to said base portion and wherein said first conductors are displaced from said second conductors in response to movement of said cover portion relative to said base portion.

GRANVILLE E. PALMER.